Patented May 31, 1927.

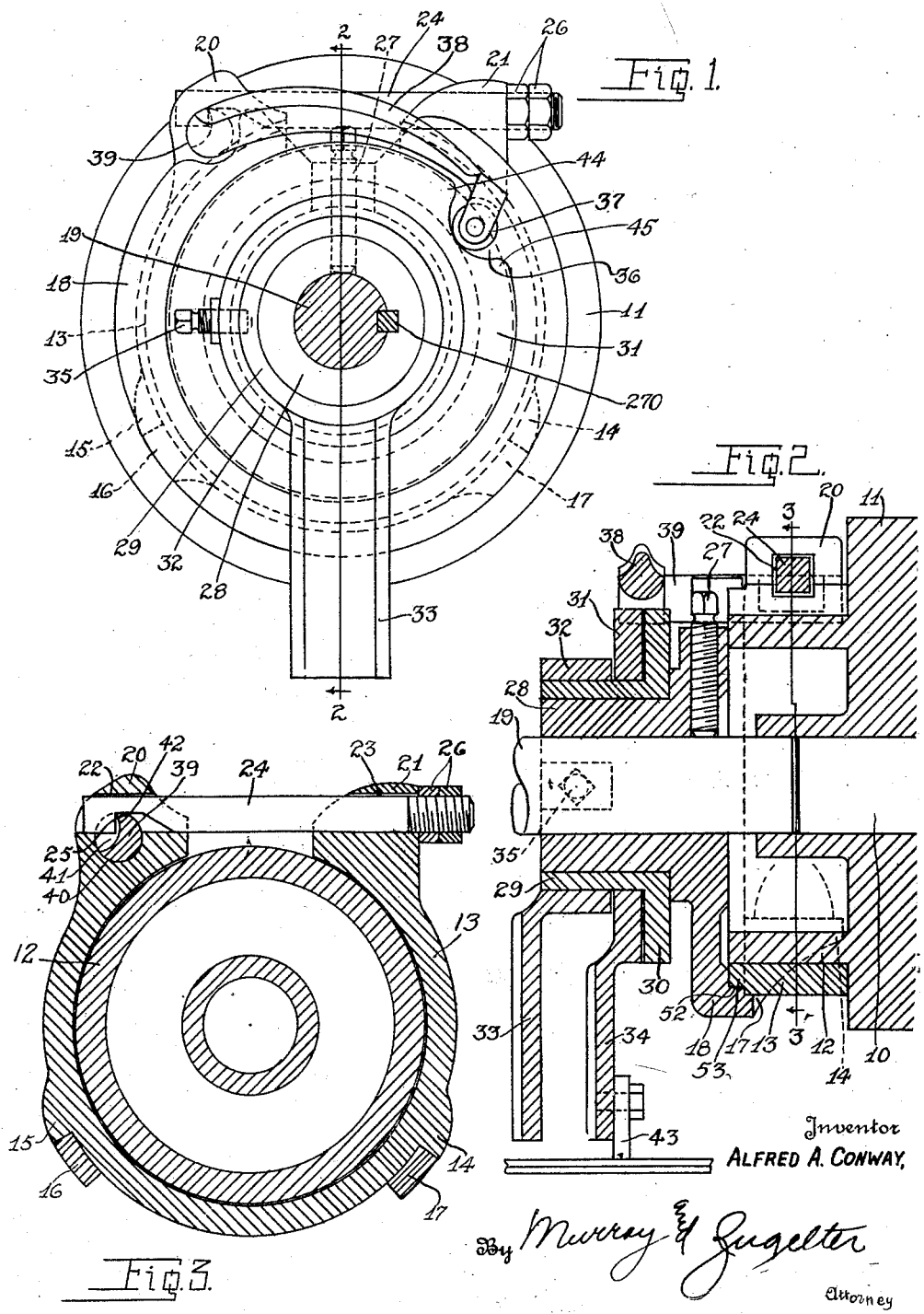

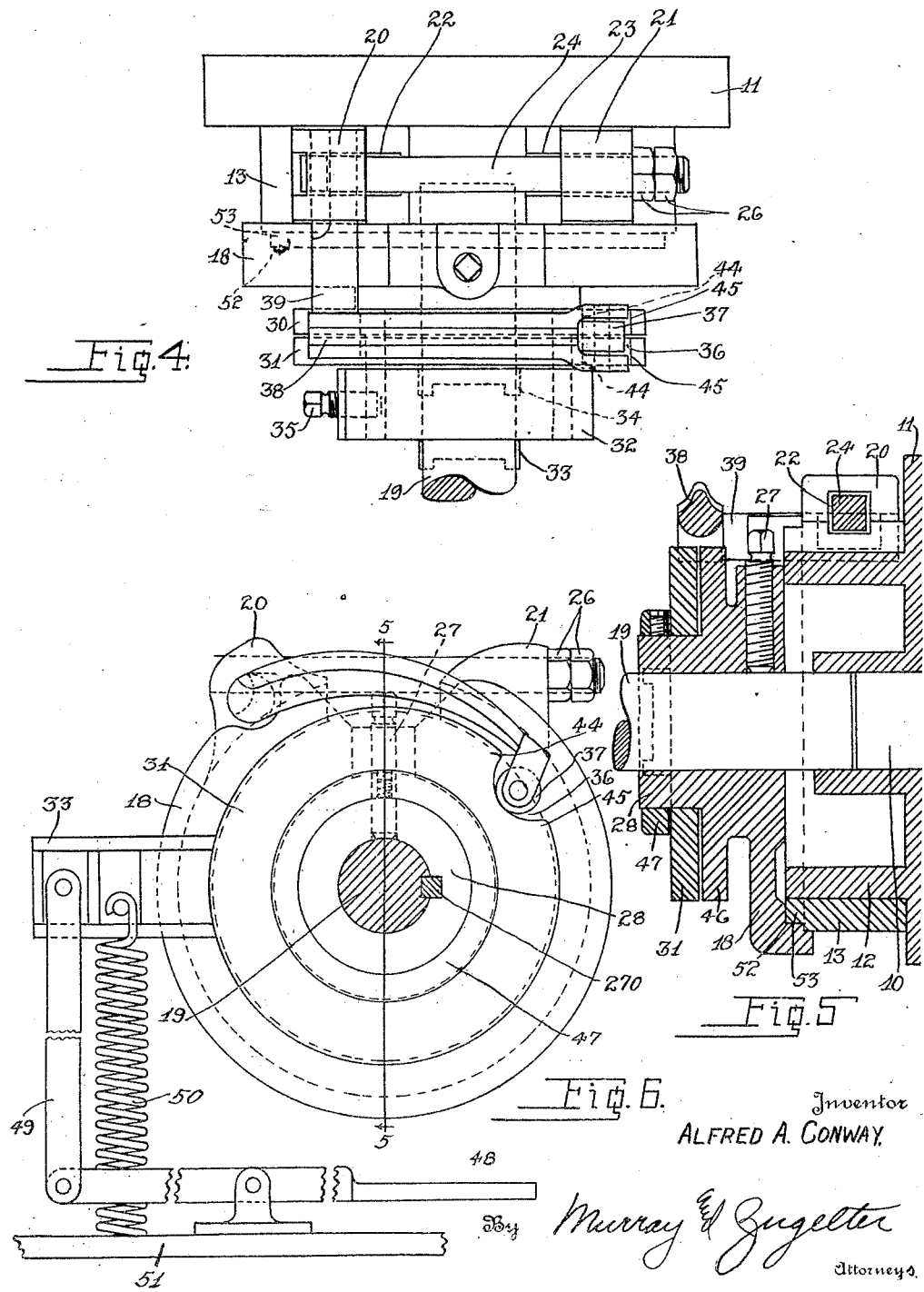

1,630,656

UNITED STATES PATENT OFFICE.

ALFRED A. CONWAY, OF CINCINNATI, OHIO.

FRICTION CLUTCH.

Application filed December 31, 1924. Serial No. 759,210.

An object of my invention is to provide a friction clutch that will transmit motion from a drive shaft to a driven shaft for a predetermined number of revolutions and stop.

Another object of my invention is to provide a clutch that is simple of construction and operation, to attain the above object.

These and other objects are attained by the means described herein and disclosed in the accompanying drawings, in which:

Fig. 1 is a front elevational view of a device embodying my invention.

Fig. 2 is a sectional view on line 2—2 of Fig. 1.

Fig. 3 is a sectional view on line 3—3 of Fig. 2.

Fig. 4 is a top plan view of the device shown in Fig. 1.

Fig. 5 is a sectional view of a modified form of my invention taken on line 5—5 of Fig. 6.

Fig. 6 is an elevational view of the device shown in Fig. 5.

The drive shaft 10 has mounted on it a gear or sprocket 11 carrying a hub or friction drum 12 from which motion is to be transmitted. Loosely mounted about the friction hub 12 is a split friction ring 13. The friction ring is provided with lugs 14 and 15 which are engaged by similar lugs 16 and 17 formed on the carrier plate 18. The lugs 14, 15, 16 and 17 are utilized to transmit motion from the drive shaft 10 to the driven shaft 19. The carrier plate is provided with a recess 52 in which is received a circular extension 53 formed on the friction band 13. The ends of the friction ring 13 are developed into ears 20 and 21 through which extend, in axial alignment, bores 22 and 23. Bores 22 and 23 receive in them a latch 24. One end of the latch is notched so as to provide an abutment 25, the object of which will be explained hereafter. The other end of the latch is threaded and has mounted on it lock nuts 26 for locking the latch in adjusted positions on the friction ring.

The carrier plate 18 is securely mounted on the driven shaft 19 by means of set screw 27 and the usual key 270 and carries a tubular bearing 28. Bearing 28 has revolubly mounted on it a sleeve 29, one end of which is developed into an annular flange or cam 30. The sleeve 29 has revolubly mounted on it a circular disc or cam 31 which is mounted adjacent the cam 30 and coincides therewith. A collar 32 having an arm 33 is mounted on the sleeve 29. The cam 31 also carries an arm 34 which is similar to the arm 33 carried by collar 32. The collar 32 is secured to the sleeve 29 and cam 30 by means of set screw 35 thereby making collar 32, sleeve 29, cam 30 and arm 33 one unit.

Cams 30 and 31 each have a depression 36 formed in them whereby corners 44 and 45 are provided. A roller 37 carried by a lever 38 normally seats in the depressions 36. The roller 37 is so positioned that one half of the roller overlaps cam 30 while the other half overlaps the cam 31. The lever 38 carries at its other end a cylindrical extension 39 which is pivotally mounted in a bore 40, formed in the ear 20 of the friction ring 13, the axis of which is parallel to that of the shaft 19. The extension 39 carries a groove 41 whereby shoulder 42 is formed. The shoulder 42 abuts the abutment 25 and is utilized to reciprocate the latch thereby bringing the ears 20 and 21 toward one another and clamping the friction band on the friction hub.

The operation of my device is as follows:

Cam 31 is locked in any desired position and by any suitable means, such as, securing arm 34 to an upright 43 by means of a bolt extending therethrough. When it is desired to transmit motion to shaft 19, arm 33 is actuated either in a clockwise or counter clockwise direction causing corner 44 or 45 to raise the roller 37 out of the depressions 36 and partially rotating lever 38 and extension 39 in a counter clockwise direction causing latch 24 to be moved to the left (see Fig. 1) and bringing ears 20 and 21 toward one another thereby clamping the split ring 13 on the friction hub 12. Driving gear 11 which has been continuously revolving now carries with it friction ring 13 which in turn rotates carrier plate 18 through the agency of the lugs 14 to 17 inclusive and shaft 19 upon which carrier plate 18 is secured. When either of the cams 30 or 31 is rotated relative to the other an unbroken periphery is presented to the roller 37, and the friction ring 13 will continue to be clamped on the friction hub 12 and will continue to transmit motion from the drive shaft 10 to the driven shaft 19 until the depressions in the cams 30 and 31 are brought into alignment again thereby allowing the roller to move into said depressions, assume its normal position and release the band from the hub.

The modified form shown in Fig. 5 is used when but one revolution of the machine or the driven shaft 19 is desired and then a stop. In this device cam 46 is cast integral with the carrier plate 18 and cam 31, carrying arm 33, is revolubly mounted on the tubular bearing 28. Collar 47 is mounted on the bearing 28 to retain the cam 31 in position. Treadle 48 is pivotally mounted on a support 51 and carries a pivotally connected link 49. The other end of the link is pivotally connected to arm 33. A spring 50 has one end secured to arm 33 and the other end to support 51. Pressure is applied to the treadle 48 thereby rotating cam 31 in clockwise direction, through the agency of the link 49 against the resistance of the spring 50, causing corner 44 to lift the roller 37 out of depressions 36 to the outside diameter of the cams 31 and 46 and clamping friction ring 13 on the hub 12. The treadle is immediately relieved of its pressure and the spring returns the cam to its normal position allowing the roller 37 to drop into notch 36 after the clutch has made one revolution, and disengage the friction ring from the hub.

What I claim is:

1. A clutch of the class described comprising a split friction band, a friction hub, a lever pivotally mounted on the band, a pair of cams engaged by the lever, and means carried by the cams for actuating the cams relative to one another for positively clamping the band on the hub.

2. A clutch of the class described comprising a split friction band, a friction hub, a latch connecting the ends of the friction band, a lever having an abutment pivotally mounted on the band and engaged by the latch, and a pair of cams for actuating the lever and latch for clamping the band on the hub.

3. A clutch of the class described comprising a split friction band, a friction hub, a latch having a notch and an abutment connecting the ends of the friction band, a lever having a roller at one end and a cylindrical extension at the other end, the cylindrical extension having a groove and a shoulder for engaging the abutment in the latch and pivotally mounted on the friction band, and a pair of cams for actuating the roller, lever, cylindrical extension and latch for clamping the band on the hub.

4. A clutch of the class described comprising a carrier plate having a tubular bearing, a split friction band supported by the carrier plate and arranged to move therewith, a friction hub for engagement by the friction band whereby to transmit motion from the hub to the band, a lever carried by the band having a cylindrical extension and pivotally mounted upon the band, said cylindrical extension having a groove and a shoulder therein, a latch having its one end fixedly mounted on the friction band, and a notch formed in its other end whereby an abutment is formed for engaging the shoulder on the cylindrical extension, a pair of cams having depressions formed in them revolubly mounted on the tubular bearing carried by the carrier plate, and means carried by the cams for relative movement of the cams one to the other for clamping and releasing the friction band on the friction hub.

5. A clutch of the class described comprising a carrier plate having a tubular bearing, a split friction band supported by the carrier plate and arranged to move therewith, a friction hub for engagement by the friction band whereby to transmit motion from the hub to the band, a lever carried by the band having a cylindrical extension and pivotally mounted upon the band, the cylindrical extension having a groove and a shoulder therein, a latch having its one end fixedly mounted on the friction band and a notch formed in its other end whereby an abutment is formed for engaging the shoulder on the cylindrical extension, a roller mounted on the other end of the lever, a pair of cams having depressions in them wherein the roller normally seats, the cams having uniform shoulders at each side of the depressions for ejecting the roller from the depressions to the outside diameter of the cams for rotating the lever about its pivotal mounting for actuating the latch thereby clamping the friction band on the hub.

6. A clutch of the class described, comprising a split friction band, a friction hub, a lever pivotally mounted on the band, means adapted to be actuated by the lever for drawing the ends of the band toward one another, a cam rotatably mounted and adapted to be engaged by the lever, and means for actuating the cam for rotating the lever about its pivotal mounting and clamping the band on the hub.

7. In a device of the class described, the combination of a friction hub, a split friction band mounted about the hub, a latch connecting the ends of the band, a lever having a cylindrical extension pivotally mounted in one end of the band, the cylindrical extension having a groove and shoulder formed therein contacting an abutment carried by the latch, a pair of cams each having a recess formed therein into which the end of the lever extends, the recesses being in alignment when the cams are in normal position, and means for rotating one of the cams and ejecting the lever from the recess for actuating the latch and clamping the friction band about the friction hub.

8. In a device of the class described, the combination of a friction hub, a split friction band mounted about the hub, a latch connecting the ends of the band, a lever having a cylindrical extension pivotally mounted in one end of the band, the cylindrical extension having a groove and shoulder formed therein contacting an abutment carried by the latch, a pair of cams each having a recess formed therein into which the end of the lever extends, the recesses being in alignment when the cams are in normal position, means for rotating one of the cams and ejecting the lever from the recess for actuating the latch and clamping the friction band about the friction hub, and yielding means for returning the cams to their normal position and aligning the recesses therein into which the end of the lever drops for releasing the band from the hub.

In testimony whereof, I have hereunto subscribed my name this 23rd day of December, 1924.

ALFRED A. CONWAY.